March 21, 1933.  E. EIMER  1,902,696
VALVE CONTROL GEAR FOR INTERNAL COMBUSTION ENGINES
Filed Jan. 7, 1930  2 Sheets-Sheet 1

INVENTOR:
Ernest Eimer
BY: Ruep, Boyu+Bakelar
ATTORNEYS

Patented Mar. 21, 1933

1,902,696

UNITED STATES PATENT OFFICE

ERNEST EIMER, OF COURBEVOIE, FRANCE, ASSIGNOR TO DELAGE & CIE, OF COURBEVOIE, FRANCE

VALVE CONTROL GEAR FOR INTERNAL COMBUSTION ENGINES

Application filed January 7, 1930, Serial No. 419,018, and in France November 12, 1929.

The invention relates to valve gears for internal combustion engines and it has for its object to improve the operation of the valves, particularly for engines running at high speeds.

The valves of internal combustion engines are usually opened by the action of a cam, which acts upon the end of the valve stem, either directly, or through the medium of rods, and the valves are closed by a spring whose force should be such as to cause the valve stem to remain constantly in connection with the closing portion of the periphery of the cam.

The proper force to be given to the spring can be readily deduced from the shape of the cam, which has already been determined in view of the acceleration to be obtained, and also from the mass of the several parts in motion.

In the case of slow-speed engines, the force of the spring can be readily ascertained, but in the case of high speed engines, the vibrations of the spring itself must be dealt with. These can be prevented to a certain extent by slightly increasing the force of the spring over the force which has been calculated, as above mentioned, from the accelerations and masses. However, it frequently happens, when running at high speed, that, although the force of the spring is considerably increased, the valve stem nevertheless recedes from the cam, or from the intermediate transmission member.

Stroboscopic observations of a valve spring operating at high speed clearly show that, beyond a certain speed, the valve no longer follows its cam, or the like, and that the coils of the spring are the seat of a marked vibratory wave; this increases the strains upon the spring to such an extent that the spring is liable to break, and reduces the reaction of the spring upon the valve stem, to such an extent that the connection between the valve and the cam becomes intermittent; when the reaction becomes again sufficient, it causes an abrupt contact between the valve stem and the cam or intermediate part, and hence a succession of shocks or "throbbing" noise.

Theoretical and practical investigations of the vibrations of such springs show that the main factor upon which depends the amplitude of such vibrations is the acceleration which is imparted to the spring by the cam, the amplitude increasing with the acceleration. In order to avoid the detrimental effects above indicated, the acceleration should be reduced as far as possible.

On the other hand, for a given valve lift and a given angular stroke of the camshaft, the acceleration will obviously vary according to the outline of the cam, and, in order to properly fill the engine cylinder, it is desirable to provide a cam affording a constant acceleration, by which the maximum lift will be assured during the maximum period of time.

The present invention has for its object to provide a valve gear for internal combustion engines which provides for a great acceleration in the movements of the valve, while reducing as much as desired the acceleration imparted to the spring by the cam. More specifically, the invention consists in interposing a motion reducing element between the valve spring and the valve body or any other part or member which participates in the motion of the valve, thus reducing the acceleration imparted to said spring, and hence the amplitude of the oscillation of the spring, the speed-reducing element consisting of a lever which is pivotally mounted on a stationary pivot pin, one end whereof is operatively connected with the valve, or with a member associated therewith, and another point of said lever engaging the valve spring.

In the accompanying drawings, which are given solely by way of example:

Figure 1:
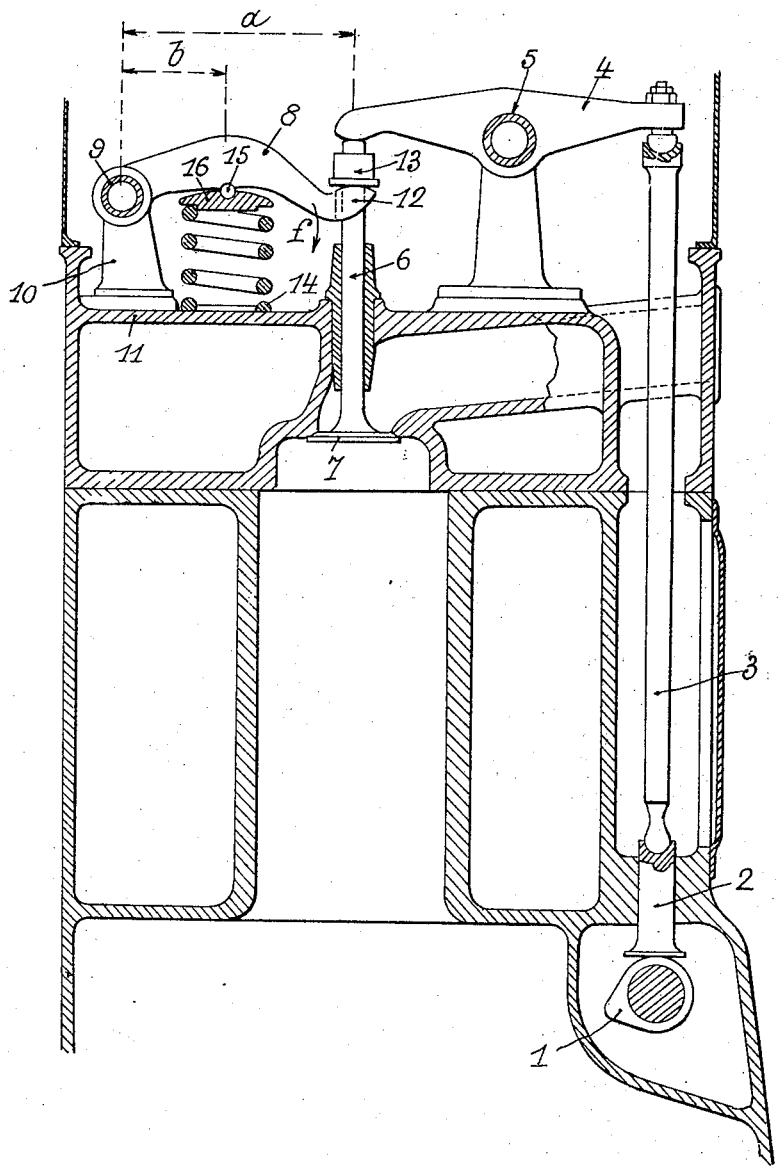
Fig. 1 shows in vertical section an improved rocker valve control arrangement according to the invention.

In the construction shown in Fig. 1, 1 is a cam which coacts in a known manner with a tappet 2 engaging a rod 3 connected to a rocker arm 4, pivotally mounted on a pivot pin 5 supported by the cylinder head 11. The other end of said rocker arm is adapted to press upon the stem 6 of an admission or exhaust valve 7.

According to an embodiment of the invention, a return lever 8 is pivoted at one end to a fixed pivot pin 9 mounted upon a bracket 10 secured to the cylinder head 11; the forked end 12 of said lever straddles said valve stem 6 which is provided with a stop 13 engaged by said lever 8 whereby the latter may be lowered in the direction of the arrow $f$, against the action of the valve spring 14, bearing at one end upon the cylinder head and at the other end upon a disk 16, engaging lever 8 at an intermediate point 15 thereof.

It will be observed in this construction, that, in comparison with a spring which would be coaxial with the stem 6 of the valve and would have the same force, the effective action of the spring 14 is increased in the ratio $$\frac{a}{b}$$

(it will for instance be double, if, as herein represented, the point 15 is at the middle point of lever 8). Inversely, the amplitude of the motion of the spring; and hence its acceleration, will be reduced in the ratio $$\frac{b}{a}$$

(it being reduced to one-half in this example). This arrangement not only affords an increase of the effective force of the spring but provides for a reduced acceleration, and the elimination of detrimental vibrations.

Figure 2:
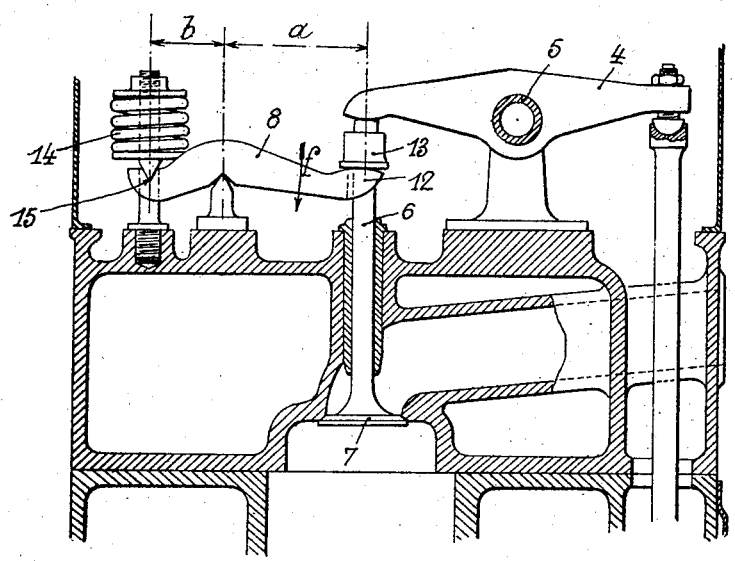
Fig. 2 is a view similar to Fig. 1 showing a modification.

Fig. 2 shows a modified construction in which the spring 14 acts upon the end of lever 8 which is pivoted at an intermediate point of its length. The device operates quite in the same manner as before.

Obviously, the invention is not limited to the form of construction herein represented. The motion reducing ratio between the spring and the moving parts of the valve may be afforded by any other means without departing from the principle of the invention.

Having now described my invention what I claim as new and desire to secure by Letters Patent is:

1. In a valve control gear for internal combustion engines, a valve, a rocker arm adapted to move the valve in one direction, a return lever adapted to move the valve in the opposite direction and a spring adapted to actuate said lever, the leverage of the valve being greater than the leverage of the spring with respect to said lever.

2. In a valve control gear for internal combustion engines, a valve, a rocker arm adapted to move the valve in one direction, a pivoted lever adapted to move the valve in the opposite direction, a pivot for said lever, and a spring adapted to actuate said lever, the fulcrum of the lever on the pivot being at a greater distance from the valve than from the spring.

3. In a valve control gear for internal combustion engines, a valve, a rocker arm engaging the end of the valve stem, a projection on said valve stem a stationary pivot, a lever rotatably mounted on said pivot and having a forked end straddling the stem of said valve below said projection, and a spring adapted to urge said forked end against said projection, the fulcrum of the lever on the pivot being at a greater distance from the valve than from the spring.

In testimony whereof I have signed my name to this specification.

ERNEST EIMER.